US010026279B1

(12) United States Patent
Beller et al.

(10) Patent No.: US 10,026,279 B1
(45) Date of Patent: Jul. 17, 2018

(54) PERSONALIZED EMERGENCY EVACUATION PLAN

(71) Applicant: INTERNATIONAL BUSINESS MACHINES CORPORATION, Armonk, NY (US)

(72) Inventors: Charles E. Beller, Baltimore, MD (US); Gregory J. Boss, Saginaw, MI (US); Mary Diane Swift, Rochester, NY (US); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/794,402

(22) Filed: Oct. 26, 2017

Related U.S. Application Data

(63) Continuation of application No. 15/646,425, filed on Jul. 11, 2017.

(51) Int. Cl.
*G08B 1/08* (2006.01)
*G08B 7/06* (2006.01)
*G09B 21/00* (2006.01)

(52) U.S. Cl.
CPC ........... *G08B 7/066* (2013.01); *G09B 21/006* (2013.01); *G09B 21/009* (2013.01)

(58) Field of Classification Search
CPC combination set(s) only.
See application file for complete search history.

(56) References Cited

U.S. PATENT DOCUMENTS

| 5,633,621 | A  | 5/1997  | McDonald       |
| 6,701,281 | B2 | 3/2004  | Satoh et al.   |
| 7,148,795 | B2 | 12/2006 | Dilbeck et al. |
| 7,349,768 | B2 | 3/2008  | Bruce et al.   |
| 7,366,674 | B2 | 4/2008  | Dione          |

(Continued)

FOREIGN PATENT DOCUMENTS

| CN | 103776452 B | 9/2016 |
| EP | 2736027 A1  | 5/2014 |

OTHER PUBLICATIONS

IBM: List of IBM Patents or Patent Applications Treated As Related (Appendix P), Oct. 27, 2017, pp. 1-2.

(Continued)

*Primary Examiner* — Travis Hunnings
(74) *Attorney, Agent, or Firm* — Samuel A. Waldbaum

(57) ABSTRACT

Embodiments of the present invention disclose a method, computer program product, and system for generating and transmitting a Personalized Emergency Evacuation Plan (PEEP). The computer receives an emergency condition real-time data from a plurality of building sensors, a tracking data of at least one user from a plurality of tracking sensors, a facility structural data from a facility database, and a stored user data from a user database for the at least one user. The computer generates a personalized emergency evacuation plan (PEEP) for the at least one user, wherein is a set of recommendations to put the user in the safest position, based on at least the emergency condition real-time data and the received stored user data. The computer transmits the PEEP to a user mobile device, wherein the user mobile device presents the PEEP to the at least one user.

1 Claim, 10 Drawing Sheets

(56) References Cited

U.S. PATENT DOCUMENTS

| | | | |
|---|---|---|---|
| 7,671,718 B2* | 3/2010 | Turner | G07C 9/00087 |
| | | | 340/10.1 |
| 7,990,279 B2 | 8/2011 | Bouressa | |
| 8,412,147 B2 | 4/2013 | Hunter et al. | |
| 8,760,288 B2* | 6/2014 | Araiza-Boys | G08B 25/12 |
| | | | 340/506 |
| 9,503,539 B1 | 11/2016 | Trundle et al. | |
| 2003/0012344 A1 | 1/2003 | Agarwal et al. | |
| 2008/0088428 A1 | 4/2008 | Pitre et al. | |
| 2008/0166992 A1* | 7/2008 | Ricordi | A61B 5/0002 |
| | | | 455/404.2 |
| 2008/0284587 A1* | 11/2008 | Saigh | H04M 1/72541 |
| | | | 340/539.13 |
| 2010/0061526 A1 | 3/2010 | Blatchley et al. | |
| 2011/0095881 A1 | 4/2011 | Rosentel et al. | |
| 2011/0136463 A1* | 6/2011 | Ebdon | G01C 21/20 |
| | | | 455/404.1 |
| 2014/0167969 A1* | 6/2014 | Wedig | G08B 7/066 |
| | | | 340/584 |
| 2015/0018011 A1* | 1/2015 | Mendelson | G01C 21/206 |
| | | | 455/456.3 |
| 2016/0203123 A1 | 7/2016 | Kozloski et al. | |
| 2016/0269882 A1 | 9/2016 | Balthasar et al. | |
| 2017/0024839 A1 | 1/2017 | Klein et al. | |
| 2017/0030720 A1* | 2/2017 | Moore | G01C 21/206 |

OTHER PUBLICATIONS

De Backere et al., "Discovery of the Potential Role of Sensors in a Personal Emergency Response System: What Can We Learn from a Single Workshop?", 2015 9th International Conference on Pervasive Computing Technologies for Healthcare (PervasiveHealth), 2015 ICST, pp. 325-328.

Bejuri et al., "Emergency Rescue Localization (ERL) using GPS, Wireless LAN and Camera", International Journal of Software Engineering and Its Applications, vol. 9, No. 9 (2015), pp. 217-232.

Lin et al., Personal Health Care Monitoring and Emergency Response Mechanisms, 2013 IEEE, pp. 1-5.

Mell et al., "The NIST Definition of Cloud Computing" Recommendations of the National Institute of Standards and Technology, Special Publication 800-145, Sep. 2011, 7 pages.

University of Portsmouth, "Personal Emergency Evacuation Plan (PEEP)", Human Resources, Health and Safety, printed on May 23, 2017, pp. 1-2

Pending U.S. Appl. No. 15/646,425, filed Jul. 11, 2017, entitled: "Personalized Emergency Evacuation Plan", pp. 1-52

\* cited by examiner

PERSONALIZED EMERGENCY EVACUATION PLAN

BACKGROUND

The present invention relates generally to the field of building evacuation plans, and more particularly to generating a personalized emergency plan for a user having a medical condition.

In the event of an emergency, some individuals may not be able to reach a safe place without aid or in a reasonable amount of time due to a medical condition which limits their cognitive or physical abilities. A Personal Emergency Evacuation Plan (PEEP) is a type of escape plan for those individuals with medical conditions, for example, blindness, deafness, amputee, or asthma, which limit their abilities. People with medical conditions can be limited by their condition as to how they can evacuate a building, reaching a safe location or following through with generic emergency evacuation procedures.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for generating and transmitting a Personalized Emergency Evacuation Plan (PEEP). The computer receives emergency condition real-time data from a plurality of building sensors and the computer receives tracking data of at least one user from a plurality of tracking sensors. The emergency condition real-time data includes at least one from the location of the emergency, alarms going off, and/or other data from any sensor within the building. The computer receives facility structural data from a facility database, wherein the facility structural data includes building layout, location of stairs, location of exits, and any other stored data about the building. The computer receives stored user data from a user database for the at least one user, wherein the stored user data includes a user age, a user gender, a user medical condition, and any other user data. The computer generates a PEEP for the at least one user, wherein the PEEP is a set of recommendations to put the user in the safest position, based on at least the emergency condition real-time data and the received stored user data. The computer transmits the PEEP to a user mobile device, wherein the user mobile device presents the PEEP to the at least one user.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
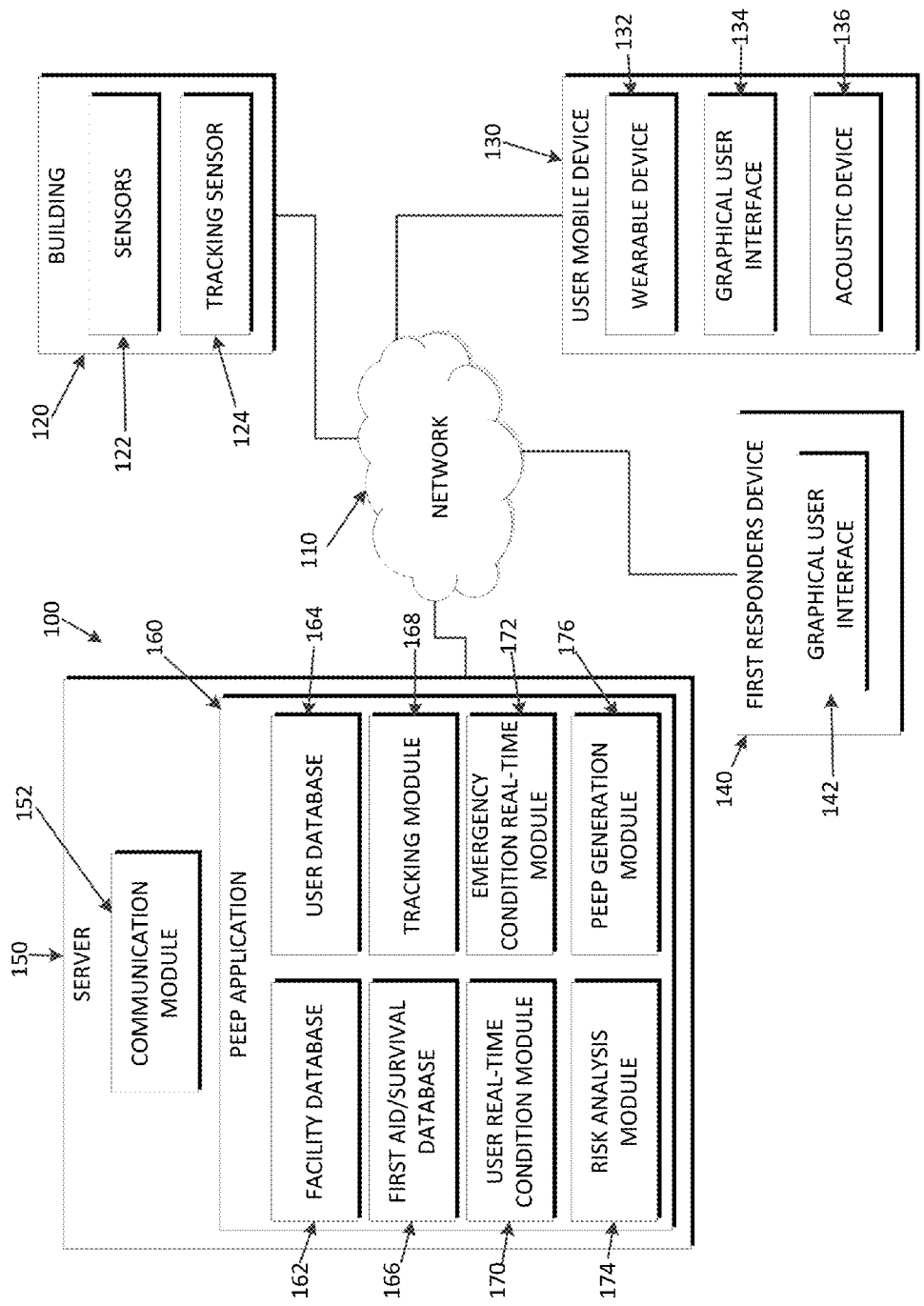
FIG. 1 is a functional block diagram illustrating a system for generating and transmitting a Personal Emergency Evacuation Plan, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a system to generate and transmit a Personal Emergency Evacuation Plan (PEEP) to a user. PEEP's are useful for individuals who have mobility impairments, sight impairments, hearing impairments, cognitive impairments, asthma, and other such medical conditions. PEEP's are also useful for individuals who have short term injuries, temporary medical conditions, and are in the later stages of pregnancy. When an emergency, such as a fire, an earthquake, a gas leak, or other such emergency, is detected the server retrieves stored building data, i.e. building layout, and real-time building data. The building uses sensors to detect emergency conditions within the building and the building can track the location of users within the building. The data gathered by the building sensors, such as temperature, presence of a fire, and other such data, in real-time is taken into consideration in the formation of the PEEP. The system then identifies users at risk. The user's mobile device transmits personal information such as age, gender, medical conditions, and other data that the mobile device is able to collect. When a wearable device is present on the user, real-time biometric data can be obtained to aid in assessing the user's current condition. The server retrieves stored data, for example, know medical conditions, physical limitations, or other stored medical data, corresponding to the user at risk. A risk analysis program uses the retrieved data and the real-time data to perform a risk assessment for the at-risk user. A PEEP is generated by taking into consideration the risk analysis and the user's current conditions. The PEEP is transmitted to the user's mobile device either through an acoustic device or a graphical user interface. The user can accept or reject the received PEEP. When the PEEP is rejected, a new PEEP will be generated. When the PEEP is accepted, the system will monitor the user's movements and adjust the PEEP to account for changing conditions. First responders will be notified of the users PEEP and the user's current location and conditions.

FIG. 1 is a functional block diagram illustrating a system for generating and transmitting a Personal Emergency Evacuation Plan (PEEP) 100, in accordance with an embodiment of the present invention.

The system for generating and transmitting a PEEP 100 includes a building 120, a user mobile device 130, a first responder's device 140, and a server 150. The building 120, the user mobile device 130, the first responder's device 140, and the server 150 are able to communicate with each other via a network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the building 120, the user mobile device 130, the first responder's device 140, and the server 150, in accordance with one or more embodiments of the invention.

The building 120 includes sensors 122 and a tracking sensor 124. The building 120 represents a structure that contains the sensors 122, which can be utilized during an emergency, such as a smoke detector, a carbon monoxide detector, a thermostat, motion sensors, and other such sensors. The building 120 further includes the tracking sensor 124 which can use a global positioning system, WIFI tracking system, cameras, or other means to track users within the building 120, or any combination thereof. The sensors 122 and the tracking sensor 124 provide the real-time collected data to the emergency condition real-time module 172, via the network 110.

The user mobile device 130 may be any type of mobile computing device that is capable of connecting to the network 110, for example, a smart phone or any programmable electronic device supporting the functionality required by one or more embodiments of the invention. The user mobile device 130 may include internal and external hardware components, as described in further detail below with respect to FIG. 6 or FIG. 7. In other embodiments, the server 150 may operate in a cloud computing environment, as described in further detail below with respect to FIGS. 8 and 9.

The user mobile device 130 may be connected to a wearable device 132, through for example, a BLUETOOTH connection. The wearable device 132 is capable of detecting heartbeat, temperature, number of steps taken, number of calories burned, and other such biometric capabilities. The data collected by the wearable device 132 is transmitted by the user mobile device 130 to the user real-time condition module 170, via the network 110.

The user mobile device 130 represents a computing device that include a user interface, for example, a graphical user interface 134. The graphical user interface 134 can be any type of application that contains the interface to receive a PEEP, input data to the PEEP application 160, receiving data from the PEEP application 160, and/or display a PEEP, for example, the application can be a web application, a graphical application, an editing application or any other type of application/program that allows a user to upload, change, delete, alter, or update data accessible to the PEEP application 160. The user mobile device 130 further includes an acoustic device 136 that is able to play an auditory PEEP. Furthermore, the acoustic device 136 is able to receive verbal commands, instructions or other statements, from the user, to indicate the user's condition.

The first responder's device 140 may be any type of computing device that is capable of connecting to network 110, for example, a laptop computer, tablet computer, netbook computer, personal computer (PC), a desktop computer, a smart phone, or any programmable electronic device supporting the functionality required by one or more embodiments of the invention. The first responder's device 140 may include internal and external hardware components, as described in further detail below with respect to FIG. 6 or FIG. 7. In other embodiments, the server 150 may operate in a cloud computing environment, as described in further detail below with respect to FIGS. 8 and 9.

The first responder's device 140 represents a computing device that include a user interface, for example, a graphical user interface 142. The graphical user interface 142 can be any type of application that contains the interface to receive a PEEP, input data to the PEEP application 160, receiving data from the PEEP application 160, and/or display a PEEP, for example, the application can be a web application, a graphical application, an editing application or any other type of application/program that allows a user to upload, change, delete, alter, or update data accessible to the PEEP application 160.

The server 150 includes a communication module 152 and a PEEP application 160. The server 150 is able to communicate with the building 120, the user mobile device 130, and the first responder's device 140, via the network 110. Server 150 may include internal and external hardware components, as depicted and described in further detail below with reference to FIG. 7. In other embodiments, the server 150 may include internal and external hardware components, as depicted and described in further detail below with respect to FIG. 8, and operate in a cloud computing environment, as depicted in FIG. 9.

The server 150 includes a communication module 152. The communication module 152 is capable of receiving and displaying data from the building 120, the user mobile device 130, and the first responder's device 140, via the network 110. The communication module 152 is also capable of transmitting and displaying data from the PEEP application 160 to the user mobile device 130 and the first responder's device 140, via the network 110. The communication module 152 is able to accomplish this either through the graphical user interfaces 134 and 142 or the acoustic device 136 or any combination thereof.

The PEEP application 160 includes a facility database 162, a user database 164, a first aid/survival database 166, a tracking module 168, a user real-time condition module 170, an emergency condition real-time module 172, a risk analysis module 174, and a PEEP generation module 176.

The facility database 162, the user database 164, and the first aid/survival database 166 are each data stores that store previously uploaded data. The facility database 162 stores data such as building layout, location of stairwells, location of exits, and other such data. The facility database 162 also stores data from the sensors 122 when there is not an emergency as a baseline. The user database 164 stores data such as age, gender, medical conditions, and other medical data that was uploaded by the user. When a wearable device 132 is present, the user database 164 stores user biometric data from a non-emergency as a baseline. The first aid/survival database 166 stores data such as first aid knowledge and survival skills.

The tracking module 168 uses tracking data received from the tracking sensor 124 within building 120 and the user mobile device 130 to determine the user location, location of other people in the vicinity of the user, and location of the emergency. The tracking data used by the tracking module 168 can be from a global positioning system, WIFI tracking system, cameras, or other means to track users within the building 120, or from tracking information received from the user mobile device 130, or any combination thereof. The tracking module 168 can confirm the safety of a user by tracking their location against that of the first responder. The tracking module 168 can transmit the user's location to the first responder's device 140, via the network 110. The tracking module 168 identifies user at risk from the emergency by comparing the user current location to the location of the emergency.

The user real-time condition module 170 receives real-time data from the user mobile device 130, such as location and user inputted information, via the network 110. The user real-time condition module 170 receives data from sensors in the user mobile device 130, such as an accelerometer, tracking sensor, and/or other sensors. When a wearable device 132 is present, real-time data such as heartbeat, temperature, number of steps taken, number of calories burned, and other such biometric capabilities are transmitted to the user real-time condition module 170, via the network 110. The user real-time condition module 170 collects the real-time user data in order to determine the current condition of the user. The user real-time condition module 170 compares the real-time data received from the user mobile device 130 to the user data stored in the user database 164 to determine the current condition of the user. The user real-time condition module 170 is able to detect changing user conditions through user inputs or if a wearable device 132 is present, through changes in the data that is continuously collected. The user real-time condition module 170 can transmit the user current condition to the first responder's device 140, via the network 110.

The emergency condition real-time module 172 receives real-time data from the building 120, via the network 110. The real-time data from the building 120 can be collected from the sensors 122. The emergency condition real-time module 172 receives real-time data such as a building alarm going off, detection of a fire, detection of a poisonous leak, and other such emergency conditions. The emergency condition real-time module 172 uses the collected real-time data in order to determine the current emergency condition. The emergency condition real-time module 172 determines the current emergency condition by comparing the real-time data to data taken in a non-emergency stored in the facility database 162. The sensors 122 determine the type of emergency, for example, smoke detectors can detect the presence of a fire or smoke, cameras can detect structural damage, and thermometers can detect the presence of a fire in the walls or floor by a temperature change. The emergency condition real-time module 172 receives the different type of data from the sensors 122, (the type of data is dependent on the type of sensor), wherein the emergency condition real-time module 172 is able to determine the type of emergency based on the received data from the sensors 122. The emergency condition real-time module 172 is able to detect if emergency conditions are changing from the real-time data it receives from the sensors 122. The emergency condition real-time module 172 can transmit the current emergency conditions to the first responder's device 140, via the network 110.

The risk analysis module 174 uses the tracking module 168 to determine a user at risk. The risk analysis module 174 then uses the facility database 162, the user database 164, the first aid/survival database 166, the user real-time condition module 170, and the emergency condition real-time module 172 to determine a ranking of potential actions the user can perform based on a risk analysis. The data from the facility database 162 and the emergency condition real-time module 172 are used to determine the safest location for the user to be during the emergency. The data from the user database 164 and the user real-time condition module 170 are used to determine any pre-existing medical conditions and any medical conditions that may have occurred due to the emergency. The first aid/survival database 166 is used to determine if the user can perform any first aid on themselves during the emergency. The risk analysis module 174 uses this data to provide plans of action for the PEEP generation module 176. If the user real-time condition module 170 or the emergency condition real-time module 172 detect changing conditions, the risk analysis module 174 will conduct a new risk analysis. The new risk analysis is conducted by analyzing the most recent data collected by the user real-time condition module 170 and the emergency condition real-time module 172.

The PEEP generation module 176 uses the risk analysis determined by the risk analysis module 174 to generate PEEP's. A PEEP is a plan of action for the user which will direct them in the most optimal position, for example, a safe location, easy access to first aid, farthest distance from the emergency, any action to direct the user to a safe location, or any combination thereof. The PEEP generation module 176 generates the PEEP, wherein the PEEP can be, for example, a map with directions, first aid instructions, acoustic commands, and/or informing the user the location of the first responders. The PEEP generation module 176 uses the information gathered by the risk analysis module 174 to determine the safest plan of action for the user. Multiple PEEP's are generated for each user based on the ranking determined by the risk analysis module 174. The PEEP generation module 176 transmits the PEEP to the user mobile device 130 and the first responder's device 140, via the network 110. The communication module 152 displays the PEEP to the user mobile device 130 and the first responder's device 140 through graphical user interfaces 134 and 142 and/or the acoustic device 136.

The tracking module 168 can further identify a second user in the vicinity of a disabled user. The PEEP generation module 176 generates a PEEP for the disabled user but transmits the PEEP to the second user. This allows for the PEEP generation module 176 to send PEEP with instructions to help a disabled user to user in his/her vicinity.

Figure 2A:
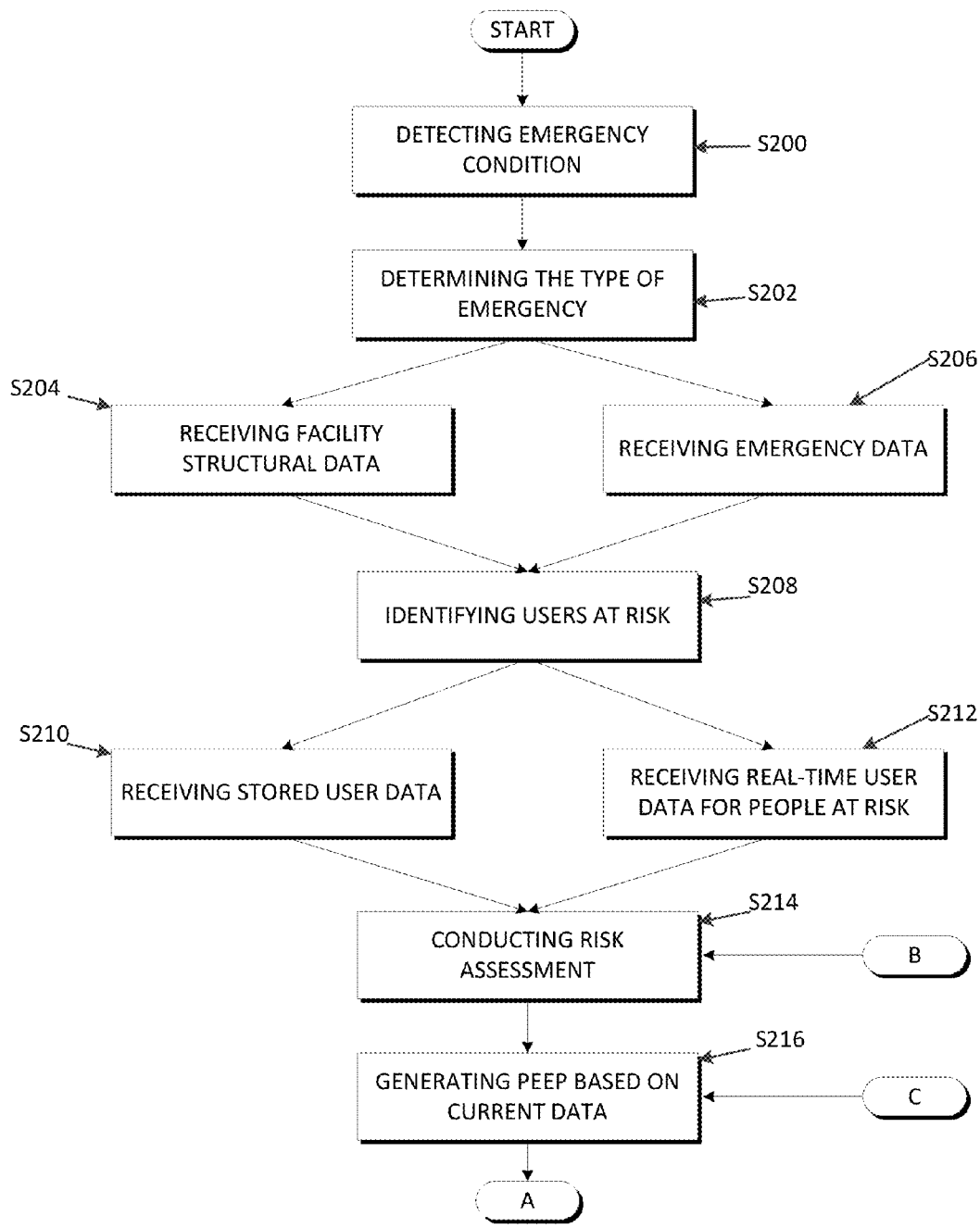
FIGS. 2A and 2B are flowcharts depicting operational steps to generate and transmit a Personal Emergency Evacuation Plan within the environment of FIG. 1, in accordance with an embodiment of the present invention.
Figure 2B:
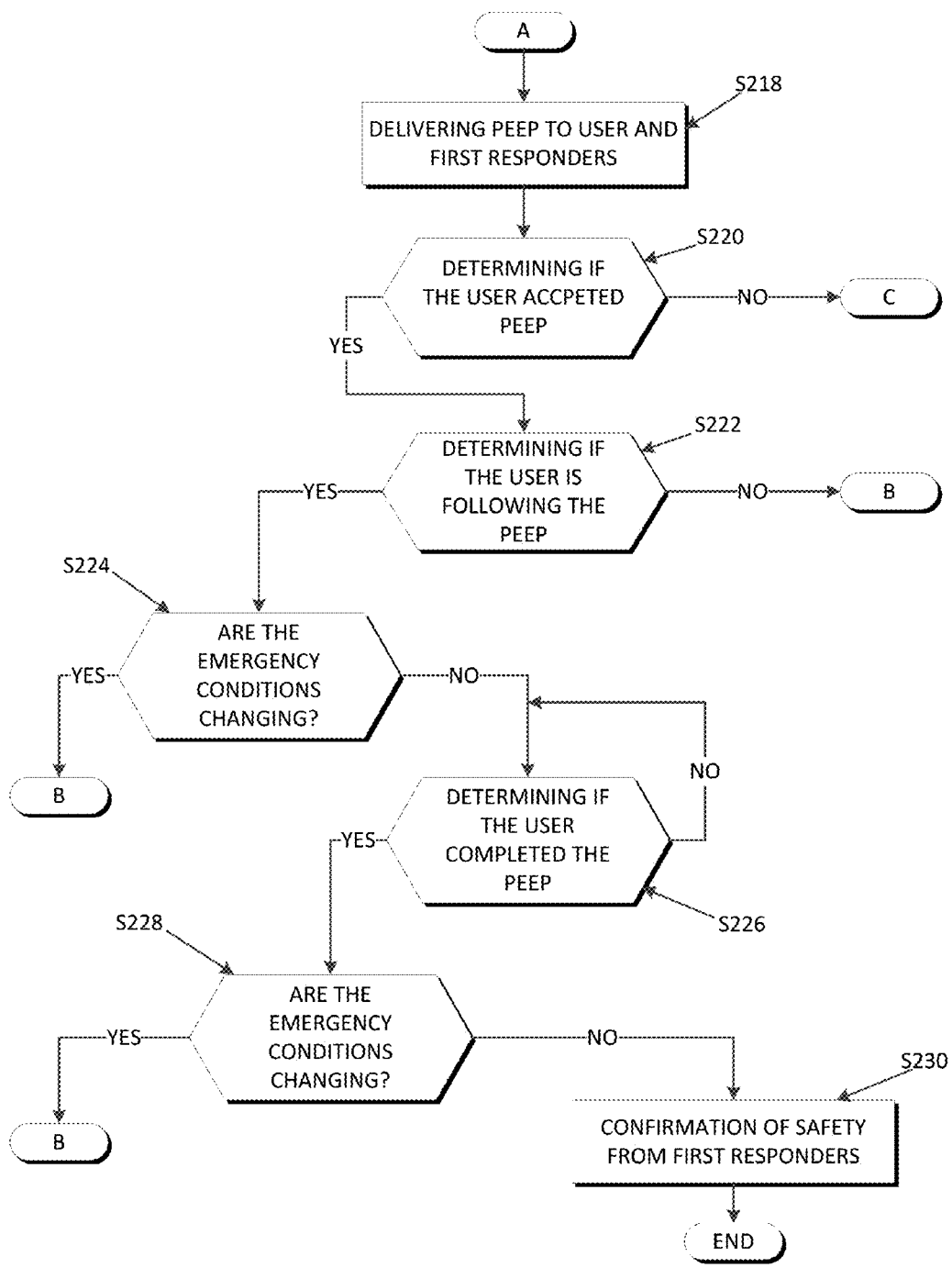

FIGS. 2A and 2B represent the server 150 receiving and gathering data from the building 120 and the user mobile device 130 to generate a PEEP and transmitting the PEEP to the user mobile device 130 and the first responder's device 140.

FIG. 2A illustrates the steps for receiving and gathering data. The emergency condition real-time module 172 detects an emergency condition based on the data transmitted from the sensors 122 (S200). Different types of sensors 122 collect different types of sensor data, wherein the emergency condition real-time module 172 is able to determine the type of emergency from the received data from the sensors 122. The emergency condition real-time module 172 is able to determine the type of emergency from the received data, for example, smoke detectors can detect the presence of a fire or smoke, cameras can detect structural damage and thermometers can detect the presence of a fire in the walls or floor by a change in the sensed temperature (S202). The risk analysis module 174 receives the facility structural data from the facility database 162 (S204). The risk analysis module 174 also receives emergency data from the emergency condition real-time module 172 (S206). S204 and S206 are happening concurrently because the real-time and stored data are being received at the same time. The tracking module 168 identifies a user at risk from the emergency by comparing the user current location to the location of the emergency (S208). The risk analysis module 174 receives stored user data, for the user that was identified as being at risk, from the user database 164 (S210). The user real-time condition module 170 receives real-time condition data from the user mobile device 130 and/or real-time data from the wearable device 132 (S212). S210 and S212 are happening concurrently because the real-time and stored data are being received at the same time. The risk analysis module 174 then conducts a risk assessment based on the data from the facility database 162, the user database 164, the tracking module 168, the user real-time condition module 170, and the emergency condition real-time module 172 (S214). The PEEP generation module 176 generates a PEEP based on the current data from the risk analysis module 174 (S216).

FIG. 2B illustrates the steps for transmitting the PEEP. The communication module 152 delivers the PEEP to the user mobile device 130 and the first responder's device 140 (S218). The graphical user interfaces 134 and 142 are able to display the PEEP and/or the acoustic device 136 is able to provide auditory instructions that correspond to the PEEP. The PEEP generation module 176 determines if the user accepted the PEEP (S220). When the user declines the PEEP, the PEEP generation module 176 generates a new PEEP based on the current data (S216). When the user accepts the PEEP, the PEEP generation module 176 determines if the user is following the PEEP based on the tracking module 168 and the user real-time condition module 170 (S222). When the user is not following the PEEP, the risk analysis module 174 conducts another risk assessment based on current conditions (S214). When the user is following the PEEP, the emergency condition real-time module 172 continuously determines if the emergency conditions are changing (S224). When the emergency conditions are changing, the risk analysis module 174 conducts another risk assessment based on current conditions (S214). When the current conditions are not changing, the tracking module 168 determines if the user completed the PEEP by tracking the user location in relation to the generated PEEP (S226). When the user does not complete the PEEP, the tracking module 168 tracks the user until the user has completed the PEEP (S226). When the user has completed the PEEP, the emergency condition real-time module 172 determines if the emergency conditions are changing (S228). When the emergency conditions are changing, the risk analysis module 174 conducts another risk assessment based on current conditions (S214). When the emergency conditions are not changing, the tracking module 168 will confirm the safety of the user from the first responders (S230).

Figure 3:
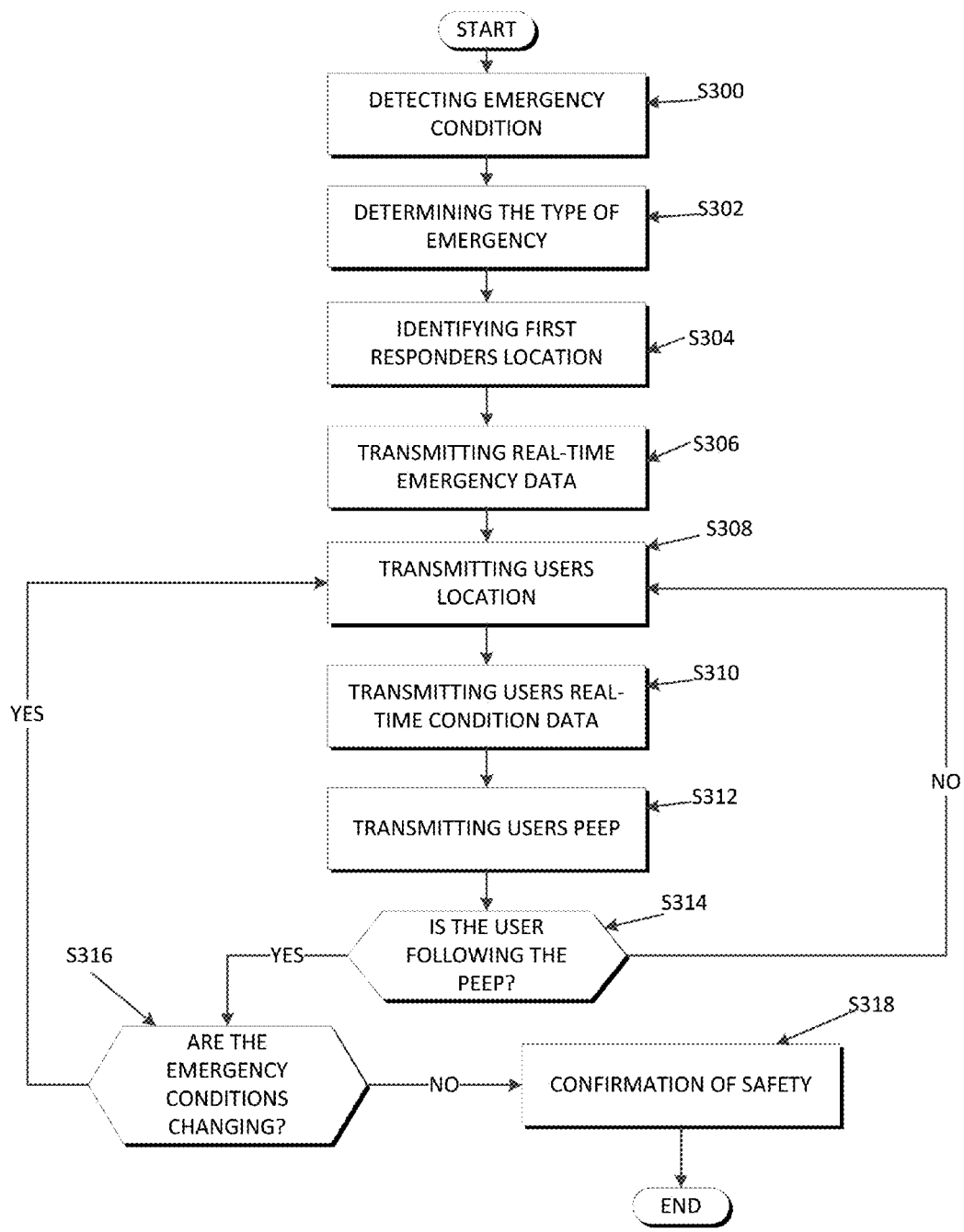
FIG. 3 is a flowchart depicting operational steps from a perspective of a first responder to obtain a user's Personal Emergency Evacuation Plan within the environment of FIG. 1, in accordance with an embodiment of the present invention.

FIG. 3 represents a first responder's device 140 receiving a user's PEEP from the server 150, via the network 110.

FIG. 3 illustrates the steps for a first responder receiving a user's PEEP. The emergency condition real-time module 172 detects an emergency condition based on the data transmitted from the sensors 122 (S300). Different types of sensors 122 collect different types of sensor data, wherein the emergency condition real-time module 172 is able to determine the type of emergency from the received data from the sensors 122. The emergency condition real-time module 172 is able to determine the type of emergency from the received data, for example, smoke detectors can detect the presence of a fire or smoke, cameras can detect structural damage and thermometers can detect the presence of a fire in the walls or floor by a change in the sensed temperature (S302). The tracking module 168 identifies the first responder's location, using a tracking component, for example, global positioning system, found in the first responder's device 140 (S304). The communication module 152 transmits real-time emergency data from the emergency condition real-time module 172 to the first responder's device 140 to be displayed on the graphical user interface 142 (S306). The communication module 152 transmits the user's location from the tracking module 168 to the first responder's device 140 (S308). The graphical user interface 142 is able to display the user's location. The communication module 152 transmits the user's real-time condition data from the user real-time condition module 170 to the first responder's device 140 (S310). The graphical user interface 142 is able to display the user real-time condition data. The communication module 152 transmits the user's PEEP to the first responder's device 140 (S312). The graphical user interface 142 is able to display the PEEP. The PEEP generation module 176 determines if the user is following the PEEP (S314). When the user is not following the PEEP, the communication module 152 transmits the user's tracked location from the tracking module 168 to the first responder's device 140 (S308). When the user is following the PEEP, the emergency condition real-time module 172 determines if the emergency conditions are changing (S316). When the emergency conditions are changing, the communication module 152 transmits the user's continuously tracked location from the tracking module 168 to the first responder's device 140 (S308). When the emergency conditions are not changing, the tracking module 168 can confirm the safety of the user with the first responder (S318).

Figure 4:
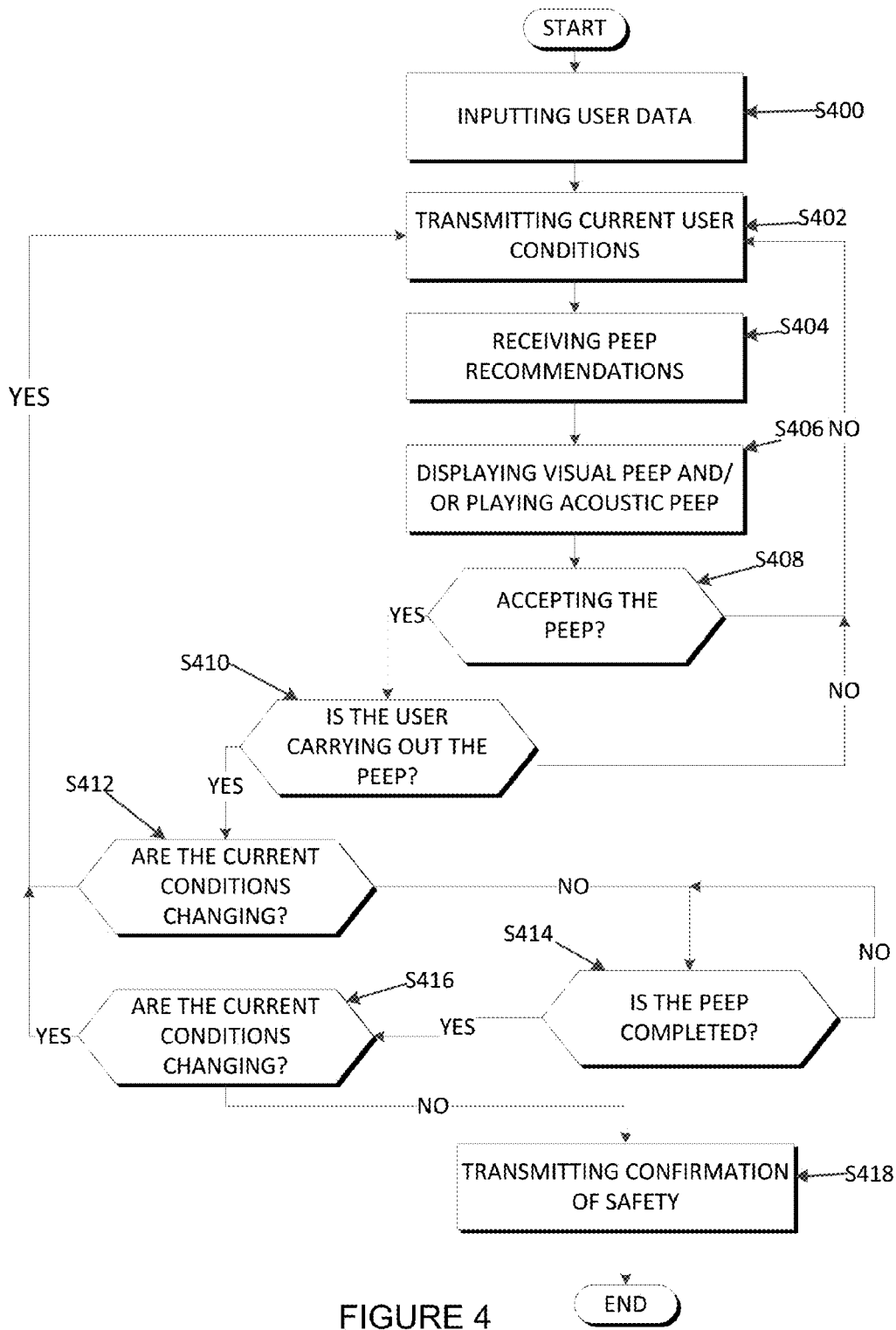
FIG. 4 is a flowchart depicting operational steps from a perspective of a user that receives a Personal Emergency Evacuation Plan within the environment of FIG. 1, in accordance with an embodiment of the present invention.

FIG. 4 represents a user in an emergency receiving a PEEP from the server 150 on the user mobile device 130, via the network 110.

FIG. 4 illustrates the steps for a user to receive a PEEP. The user inputs user data into the user mobile device 130 either by manually inputting the information via the graphical user interface 134 and/or by verbally inputting the information via the acoustic device 136 (S400). The user mobile device 130 transmits the current user conditions from user inputs and/or from the wearable device 132, when present, to the user real-time condition module 170 (S402).

The user mobile device receives PEEP recommendations from the PEEP generation module 176 (S404). The graphical user interface 134 displays the visual PEEP and/or the acoustic device 136 plays an acoustic PEEP (S406). The user mobile device 130 determines if the user accepts the PEEP either through accepting it on the graphical user interface 134 and/or verbally accepting it through the acoustic device 136 (S408). When the user does not accept the PEEP, the user mobile device 130 transmits the current user conditions from user inputs and/or from the wearable device 132, when present, to the user real-time condition module 170 (S402).

When the user accepts the PEEP, the PEEP generation module 176 determines if the user is carrying out the PEEP based on the tracking module 168 and the user real-time condition module 170 (S410). When the user is not carrying out the PEEP, the user mobile device 130 transmits the current user conditions from user inputs and/or from the wearable device 132, when present, to the user real-time condition module 170 (S402).

When the user is carrying out the PEEP, the emergency condition real-time module 172 and the user real-time condition module 170 determine if the current emergency conditions are changing (S412). When the current conditions are changing, the user mobile device 130 transmits the current user conditions from user inputs and/or from the wearable device 132, when present, to the user real-time condition module 170 (S402). When the current conditions are not changing, the tracking module 168 determines if the user completed the PEEP by tracking the user location in relation to the generated PEEP (S414). When the user is not completing the PEEP, the tracking module 168 tracks the user until the user has completed the PEEP (S414). When the user has completed the PEEP, the emergency condition real-time module 172 and the user real-time condition module 170 determine if the current conditions are changing (S416). When the current conditions are changing, the communication module 152 transmits current user conditions from user inputs into the user mobile device 130 and/or from the wearable device 132, when present, to the user real-time condition module 170 (S402). When the current conditions are not changing, the tracking module 168 can confirm the safety of the user with the first responder (S418).

Figure 5:
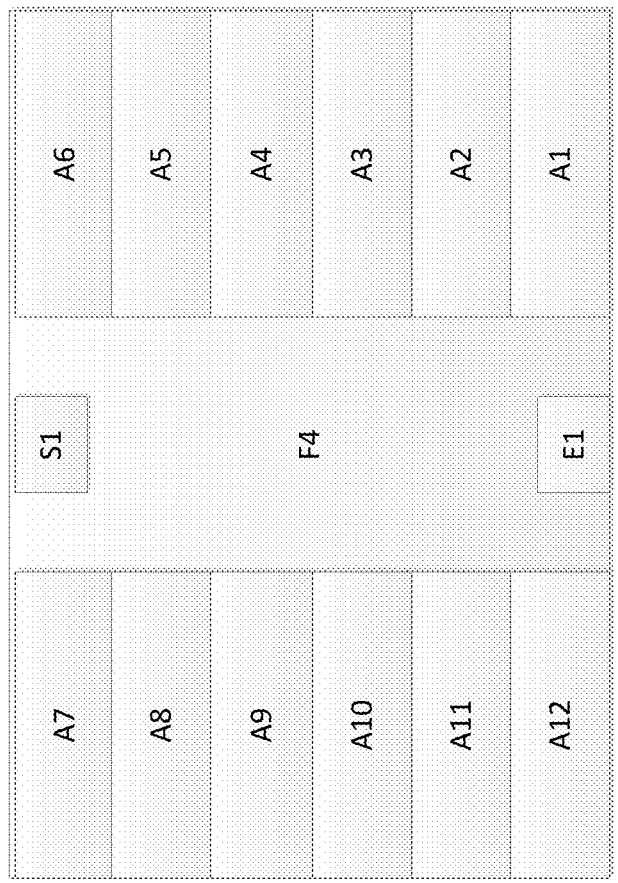
FIG. 5 illustrates an example of a building layout, where the present invention can be implemented.
Figure 5:
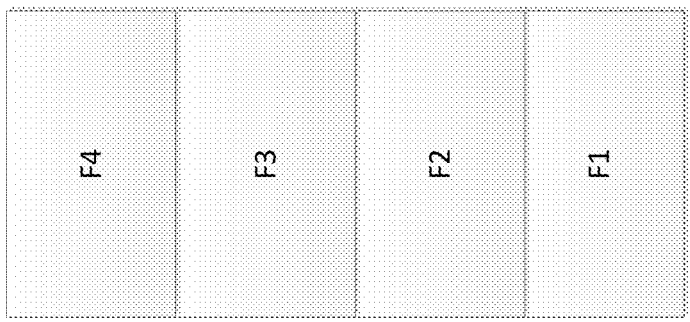

FIG. 5 represents a situation in which the system for generating and transmitting a PEEP 100 is used.

FIG. 5 illustrates a building that includes floors F1 through F4 and floor F4 with apartments/office units A1 through A12, stairs S1, and elevator E1. The following exemplary situation illustrates the disclosed invention being utilized. There is a user in apartment A4 who is elderly and uses a walker. The sensors 122 detect a fire in apartment A1. The risk analysis module 174 and the PEEP generation module 176 receive structural data from the facility database 162, user data from the user database 164, assistance data from the first aid/survival database 166, tracking data from the tracking module 168, real-time condition data from the user real-time condition module 170, and real-time emergency data from the emergency condition real-time module 172.

The PEEP generation module 176 generates a PEEP based on the received data. The user mobile device 130 of the elderly person at risk receives the PEEP via the graphical user interface 134 and/or the acoustic device 136. The elderly person accepts the PEEP via the graphical user interface 134 and/or the acoustic device 136 of the user mobile device 130. The PEEP recommends the elderly person to take the elevator E1, when available, instead of the stairs S1 due to his/her mobility impairment. A different recommendation can be made when the elevator E1 is not available or accessible. The elderly person is tracked by the tracking module 168 leaving apartment A4 and moving toward the elevator E1. The user real-time condition module 170 detects that he/she is having breathing difficulties based on the heartbeat data from the wearable device 132. A new risk analysis is performed by the risk analysis module 174 and a new PEEP is generated by the PEEP generation module 176. The elderly person receives an alert via the graphical user interface 134 and/or the acoustic device 136 on the user mobile device 130 that a new PEEP has been received. The elderly person accepts the new PEEP via the graphical user interface 134 and/or the acoustic device 136. The new PEEP recommends that the elderly person walk to apartment A7 and wait for first responders to arrive. Apartment A7 is the farthest apartment from the fire in apartment A1. The tracking module 168 detects that first responders are in apartment A7 with the elderly person. The elderly person is safe and the PEEP is complete.

The following is another exemplary situation that illustrates the disclosed invention being utilized, similar to the situation previously described, in accordance with FIG. 5. The user in apartment A4 is visually impaired. The sensors 122 detect a fire in apartment A1. The tracking module 168 identifies a user in apartment A9 who does not have any medical conditions. The risk analysis module 174 and the PEEP generation module 176 receive structural data from the facility database 162, user data from the user database 164, assistance data from the first aid/survival database 166, tracking data from the tracking module 168, real-time condition data from the user real-time condition module 170, and real-time emergency data from the emergency condition real-time module 172.

The PEEP generation module 176 generates a PEEP based on the received data. The user mobile device 130 of the visually impaired person at risk receives the PEEP, and plays the auditory PEEP via the acoustic device 136. The user mobile device 130 of the user in apartment A9 who is not at risk receives the PEEP via the graphical user interface 134 and/or the acoustic device 136. The PEEP recommends that the user in apartment A9 who is not at risk escort the visually impaired person in apartment A4 down the stairs S1. When the stairs S1 are not available or accessible, a different recommendation would be made. The visually impaired person and the user not at risk are tracked by the tracking module 168 leaving apartment A4 and moving down the stairs S1. The tracking module 168 detects that the visually impaired person and the user not at risk have exited the building safely. The PEEP is complete.

Figure 6:
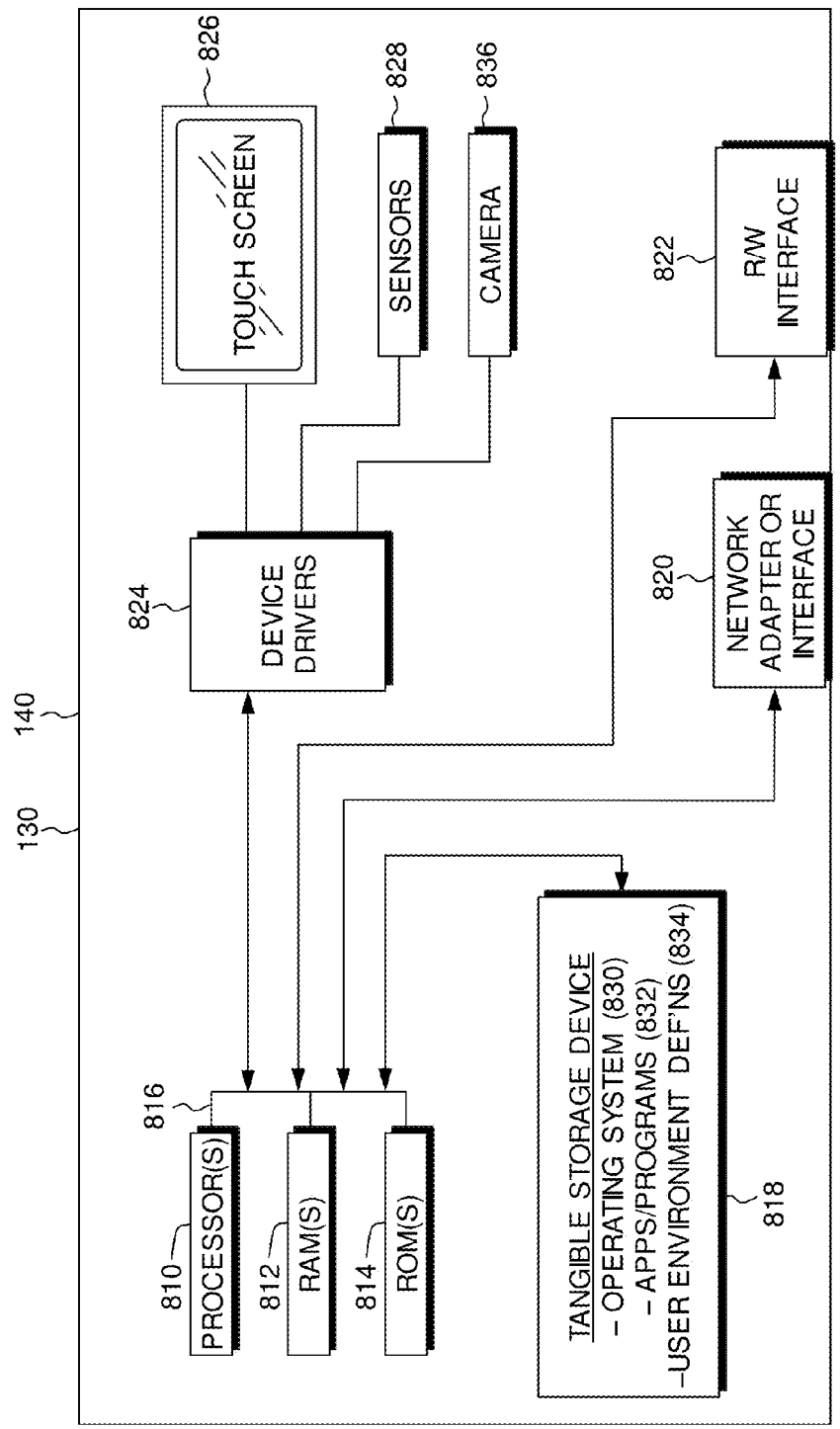
FIG. 6 is a block diagram of components of a mobile device of the system for receiving a Personal Emergency Evacuation Plan of FIG. 1, in accordance with embodiments of the present invention.

FIG. 6 is a block diagram of components of the user mobile device 130 and/or the first responder's device 140 for invoking a user environment based on a device cover, in accordance with an embodiment of the present invention. In an exemplary embodiment, the user mobile device 130 and/or the first responder's device 140 include one or more processors 810, one or more computer-readable RAMs 812, one or more computer-readable ROMs 814, and one or more computer-readable tangible storage devices 818 on one or more buses 816. One or more operating systems 830, one or more apps or programs 832, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

The user mobile device 130 and/or the first responder's device 140 also includes a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

The user mobile device 130 and/or the first responder's device 140 also includes a network adapter or interface 820, such as a TCP/IP adapter card or wireless communication adapter (such as a 4G wireless communication adapter using OFDMA technology). The apps and programs 832 and the user environment definitions 834 can be downloaded to the user mobile device 130 and/or the first responder's device 140 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

The user mobile device 130 and/or the first responder's device 140 also includes a touch screen 826, a camera 836, sensors 828, for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 6 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

Figure 7:
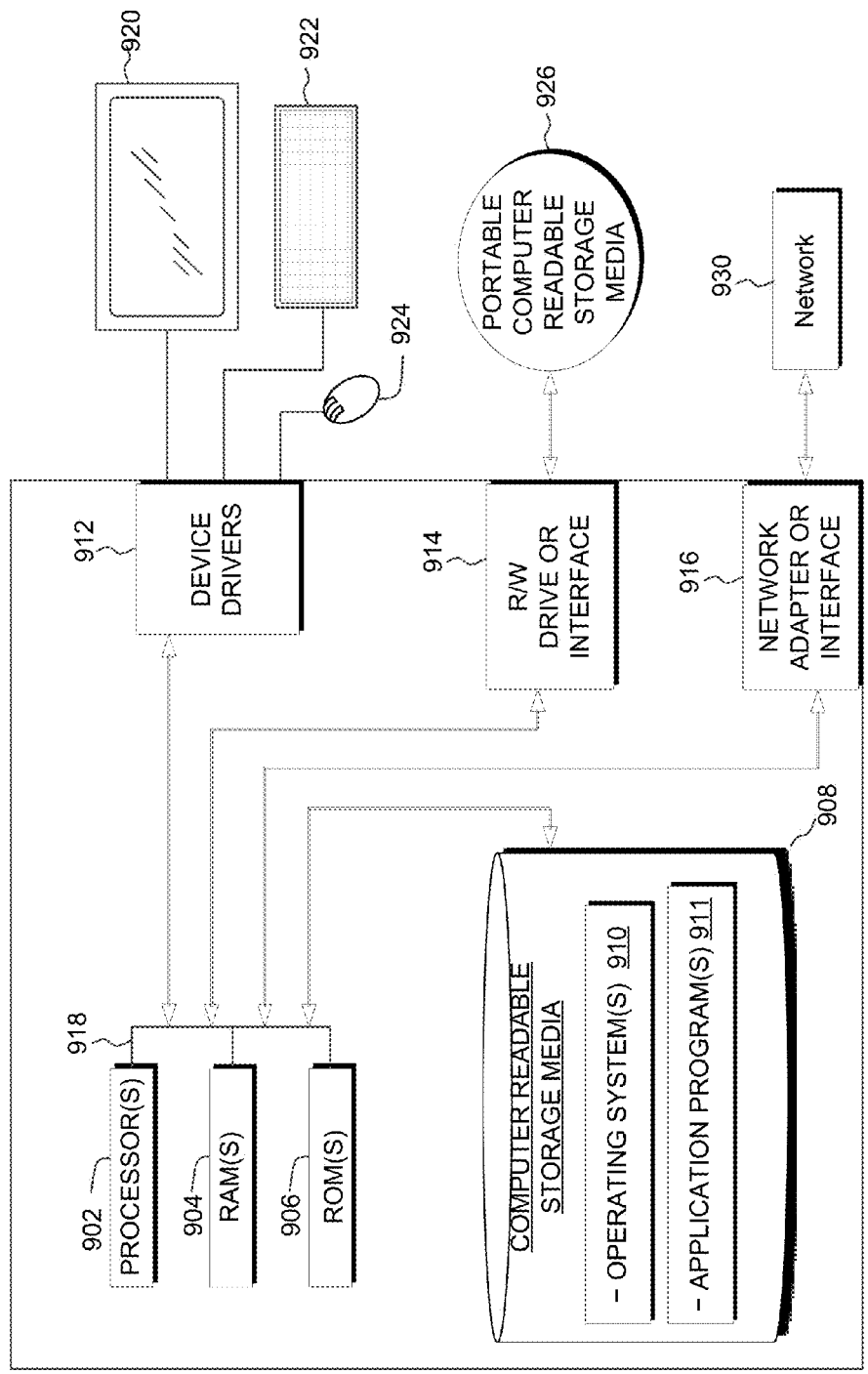
FIG. 7 is a block diagram of components of a computing device of the system for generating and transmitting a Personal Emergency Evacuation Plan of FIG. 1, in accordance with embodiments of the present invention.

FIG. 7 depicts a block diagram of components of the user mobile device 130 and/or the first responder's device 140 of the system for generating and transmitting a PEEP 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The user mobile device 130 and/or the first responder's device 140 and/or the server 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the PEEP application 160 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user mobile device 130 and/or the first responder's device 140 and/or the server 150 may also include a R/W drive or interface 914 to read from and write to one or more portable computer readable storage media 926. Application programs 911 on the user mobile device 130 and/or the first responder's device 140 and/or the server 150 may be stored on one or more of the portable computer readable storage media 926, read via the respective R/W drive or interface 914 and loaded into the respective computer readable storage media 908.

The user mobile device 130 and/or the first responder's device 140 and/or the server 150 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user mobile device 130 and/or the first responder's device 140 and/or the server 150 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user mobile device 130 and/or the first responder's device 140 and/or the server 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
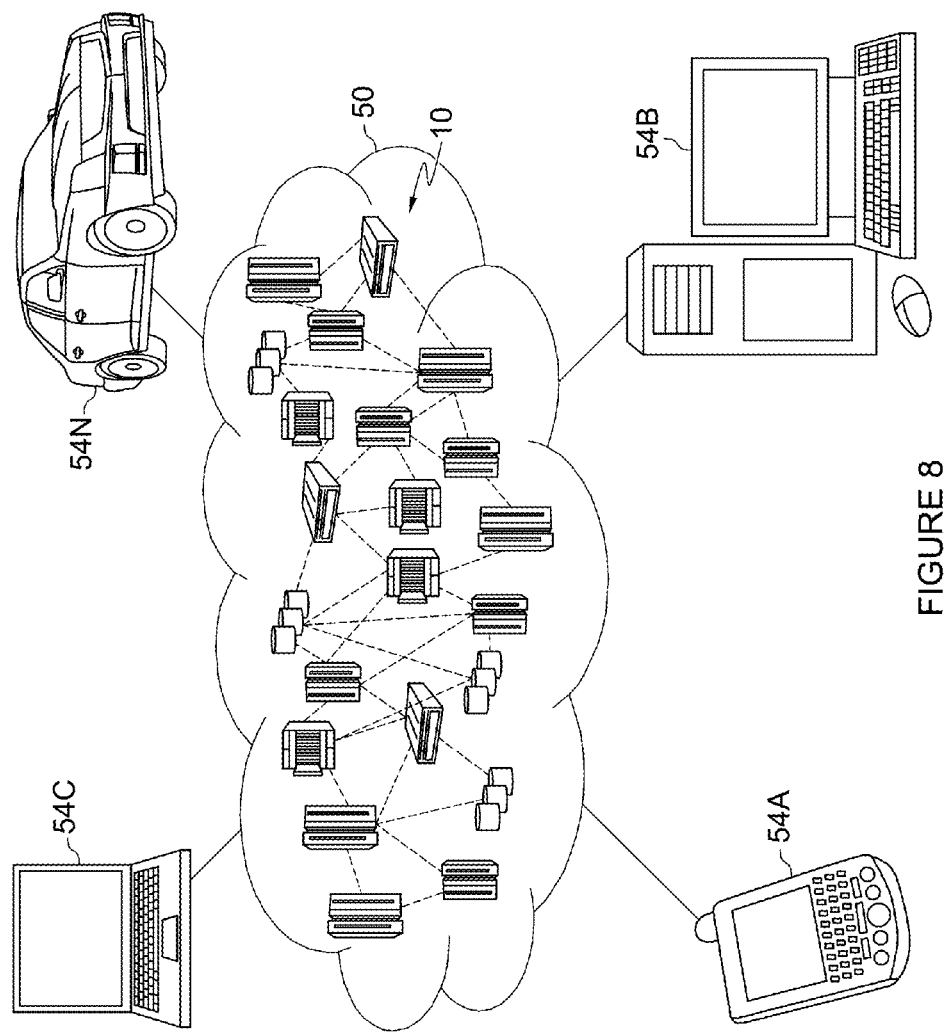
FIG. 8 depicts a cloud computing environment according to an embodiment of the present invention.
Figure 9:
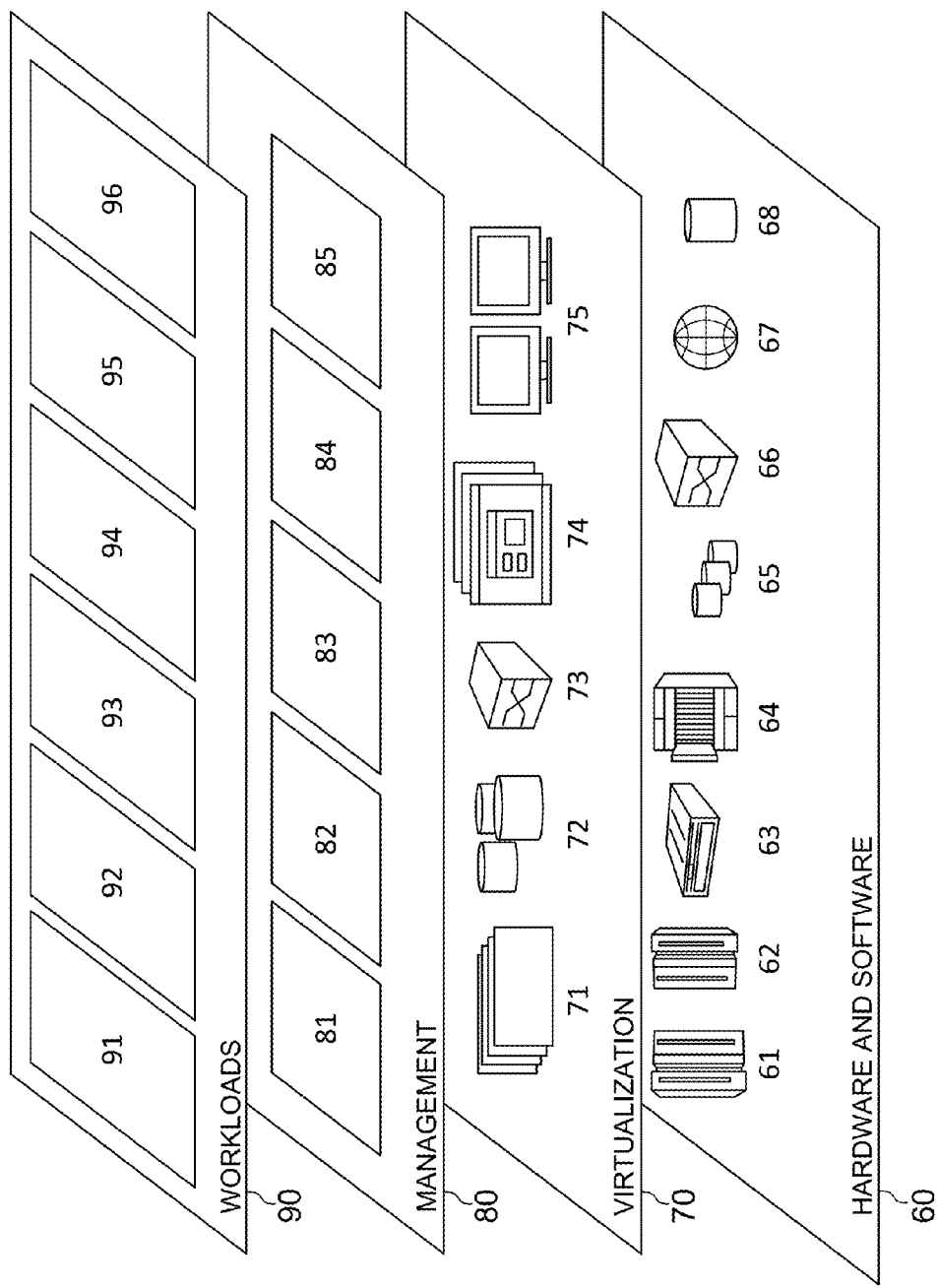
FIG. 9 depicts abstraction model layers according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PEEP application 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for generating and transmitting a Personalized Emergency Evacuation Plan (PEEP), the method comprising:

receiving, by a computer, an emergency condition real-time data from a plurality of building sensors and receiving, by the computer, a tracking data of at least one user from a plurality of tracking sensors, wherein the emergency condition real-time data includes at least one from the location of the emergency, alarms going off, and/or other data from any sensor within the building;

receiving, by the computer, a facility structural data from a facility database, wherein the facility structural data includes building layout, location of stairs, location of exits, and any other stored data about the building;

receiving, by the computer, a stored user data from a user database for the at least one user, wherein the stored user data includes a user age, a user gender, a user medical condition, and any other user data, wherein the user medical condition indicates that the user is visually impaired;

generating, by the computer, a personalized emergency evacuation plan (PEEP) for the at least one user, wherein is a set of recommendations to put the user in the safest position, based on at least the emergency condition real-time data and the received stored user data, wherein the generated PEEP includes acoustic instructions for the least one user;

transmitting, by the computer, the PEEP to a user mobile device, wherein the user mobile device plays the acoustic instructions of the PEEP to the at least one user;

receiving, by a computer, a change in the emergency condition real-time data from the plurality of building sensors and receiving, by the computer, new tracking data of at least one user from the plurality of tracking sensors;

generating, by the computer, a new PEEP for the at least one user, wherein is a set of recommendations to put the user in the safest position, based on at least the changing emergency condition real-time data and the received stored user data, wherein the generated new PEEP includes acoustic instructions for the least one user; and transmitting, by the computer, the new PEEP to the user mobile device, wherein the user mobile device plays the acoustic instructions of the PEEP to the at least one user.

* * * * *